(12) United States Patent
Beth Halachmi et al.

(10) Patent No.: US 12,275,210 B2
(45) Date of Patent: Apr. 15, 2025

(54) UNIT FOR TREATING USED FOOD PACKAGES

(71) Applicant: SOLO GELATO LTD., Hila (IL)

(72) Inventors: Barak Beth Halachmi, Hila (IL); Ben Sagi, Ramat Gan (IL)

(73) Assignee: SOLO GELATO LTD., Hila (IL)

( * ) Notice: Subject to any disclaimer, the term of this patent is extended or adjusted under 35 U.S.C. 154(b) by 0 days.

(21) Appl. No.: 18/730,143

(22) PCT Filed: Feb. 28, 2023

(86) PCT No.: PCT/IL2023/050209
§ 371 (c)(1),
(2) Date: Jul. 18, 2024

(87) PCT Pub. No.: WO2023/166505
PCT Pub. Date: Sep. 7, 2023

(65) Prior Publication Data
US 2024/0416606 A1    Dec. 19, 2024

(30) Foreign Application Priority Data

Mar. 2, 2022  (IL) .......................................... 291066

(51) Int. Cl.
| | |
|---|---|
| *B30B 15/06* | (2006.01) |
| *B30B 9/06* | (2006.01) |
| *B30B 9/26* | (2006.01) |
| *B30B 15/34* | (2006.01) |
| *B65F 1/14* | (2006.01) |
| *B29B 17/00* | (2006.01) |

(52) U.S. Cl.
CPC ............... *B30B 9/06* (2013.01); *B30B 9/26* (2013.01); *B30B 15/06* (2013.01); *B30B 15/064* (2013.01); *B30B 15/34* (2013.01); *B65F 1/1405* (2013.01); *B29B 17/0047* (2013.01); *B65F 2210/162* (2013.01)

(58) Field of Classification Search
CPC .......... B30B 9/06; B30B 9/26; B30B 15/064; B30B 15/34; B29B 17/0047; B29B 17/0052; Y02W 30/62
See application file for complete search history.

(56) References Cited

U.S. PATENT DOCUMENTS

| | | | |
|---|---|---|---|
| 3,765,148 A | | 10/1973 | Ippolito et al. |
| 3,808,453 A | * | 4/1974 | Engebretsen ......... B30B 9/3007 307/112 |
| 5,411,697 A | * | 5/1995 | McGraw ............... B30B 9/3007 428/903.3 |

FOREIGN PATENT DOCUMENTS

| | | |
|---|---|---|
| CN | 111674766 | 9/2020 |
| CN | 111791523 A * | 10/2020 |

(Continued)

OTHER PUBLICATIONS

International Search Report and Written Opinion dated May 25, 2023 in International Application No. PCT/IL2023/050209.

*Primary Examiner* — Jared O Brown
(74) *Attorney, Agent, or Firm* — Tarolli, Sundheim, Covell & Tummino LLP (57) ABSTRACT

The present disclosure concerns units for treating used food packages, more specifically for separation and compactization of used capsules containing edible ingredients residues, such that the units are configured to receive and compact a stack of used food packages, as well as separate food substance residues from the packages during such compaction.

18 Claims, 7 Drawing Sheets

(56) References Cited

FOREIGN PATENT DOCUMENTS

| | | | | | |
|---|---|---|---|---|---|
| CN | 112192879 | A | * | 1/2021 | |
| CN | 215464923 | U | * | 1/2022 | |
| GB | 1411289 | | | 10/1975 | |
| GB | 1411289 | A | * | 10/1975 | ............... B30B 9/30 |
| JP | H06183507 | A | * | 7/1994 | |
| JP | 2006021005 | | | 1/2006 | |
| JP | 2008173646 | A | * | 7/2008 | |
| WO | WO-9421436 | A1 | * | 9/1994 | ........... B30B 9/3035 |
| WO | 2013121421 | | | 8/2013 | |
| WO | 2014078893 | | | 5/2014 | |
| WO | 2018008028 | | | 1/2018 | |
| WO | 2018029609 | | | 2/2018 | |
| WO | 2019186492 | | | 10/2019 | |
| WO | 2020089919 | | | 5/2020 | |
| WO | 2021038118 | | | 3/2021 | |
| WO | 2023166505 | | | 9/2023 | |

\* cited by examiner

UNIT FOR TREATING USED FOOD PACKAGES

RELATED APPLICATIONS

This application is a U.S. National Stage Application filed under 35 USC 371 claiming priority to Serial No. PCT/IL2023/050209 filed on Feb. 28, 2023; which claims priority from Israeli Application No. 291066, filed Mar. 2, 2022, the entireties of which are hereby incorporated herein by reference.

TECHNOLOGICAL FIELD

The present disclosure concerns units for treating used food packages, more specifically for separation and compactization of used capsules containing edible ingredients residues.

BACKGROUND ART

References considered to be relevant as background to the presently disclosed subject matter are listed below:
PCT patent publication WO2013/121421
PCT patent publication WO2018/008028
PCT patent publication WO2020/089919
PCT patent publication WO2021/038118
PCT patent publication WO2019/186492
PCT patent publication WO2018/029609
PCT patent publication WO2014/078893

Acknowledgement of the above references herein is not to be inferred as meaning that these are in any way relevant to the patentability of the presently disclosed subject matter.

BACKGROUND

Various domestic appliances utilize food-containing packages, used in the preparation of single serving food products or beverages, for example coffee capsules, capsules containing raw materials for the preparation of ice-cream, etc. Typically, after preparation of the food product is completed, the used food packages are collected in a designated vessel or chamber, either within the preparation appliance or an external vessel, which is emptied on a periodic basis.

Such used food packages are typically voluminous, and often contain residues of food substances and/or raw food ingredients, that start to decompose or ferment over time, resulting in malodors.

Hence, it would be beneficial to provide a unit for treating such used food packages in order to reduce their volume while separating the food residues therefrom as part of such treatment.

GENERAL DESCRIPTION

The present disclosure concerns a unit for treating used food packages in a manner permitting initial separation between the package and the residues of food contained therein, while obtaining compactization of the packages, as to permit reduction in their volume and increased case of disposal. The unit disclosed herein permits the user to carry out the first step in the process of recycling of the used food packages at the point of use.

Thus, according to one of its aspects, the present disclosure provides a unit for treating used food packages. The unit comprises a container that has a longitudinal axis and is dimensioned to receive one or more used stackable food packages. The container has a top chamber, a bottom chamber integrable therewith and configured to receive food residues, and a perforated element separating therebetween. The top chamber is dimensioned to receive a plurality of used food packages, such that nestably stackable used food packages can be inserted into the top chamber and stacked therein.

The perforated element separating between the top and bottom chambers can be a perforated wall or a removable perforated element. By some embodiments, the perforated element is a substantially horizontal perforated wall (i.e. substantially perpendicular to the top and bottom chambers' walls).

The perforated element separates between the top chamber and the bottom chamber, and is configured to permit food residues to pass therethrough from the food packages stacked in the top chamber to the bottom chamber. In other words, the used food packages are received in the top chamber with their opening facing the perforated element, and can be stacked one over the other in a nestable manner in the top chamber. Due to the perforations in the perforated element, food residues can pass through the perforated element and collect in the bottom chamber. Thus, gravitational separation is obtained between the food residues and the used food packages.

The unit also comprises a piston that is configured with a substantially horizontal, heatable plate (meaning that the piston is substantially perpendicular to the longitudinal axis of the container). The piston is axially displaceable within the top chamber between an extended position, in which the heatable plate comes into contact with a topmost food package of the stack, and a retracted position in which the heatable plate does not contact said topmost food package of the stack. The piston is configured to apply pressure onto said stack when in the extended position, such pressure assisting in nesting the used packages one into the other and compacting the stack of packages, while also assisting in extracting the food residues from the containers. The heatable plate is configured to heat at least a portion of a topmost food package in the stack when in the extended state, thereby adhering said topmost food package to a next-in-line food package in said stack to obtain a compacted stack of said used food packages.

Hence, the piston functions both to cause compactization of the stack to reduce its volume by applying pressure, and to cause adherence of at least portions of packages in the stack one to the other, thereby forming a compact stack in which the packages are nested one into the other and adhered one to the other. Such adherence provides for ease of extraction of the stack from the unit when a user is required to empty the unit, as well as assist in maintaining a compact volume of the stack.

Upon operation, a user inserts a first used package into the top chamber with its opening facing downwards (i.e. facing the perforated element), allowing food residues to trickle from the package towards the bottom chamber through the perforated element. Upon insertion of a second, subsequent package in the same orientation into the top chamber, the packages are stacked one over the other, at times also at least partially nested one into the other. The piston is then operated to switch from its retracted position to its extended position, thereby applying pressure onto the topmost package in the stack, while also applying heating onto at least a portion of the topmost package by the heatable plate. The applied pressure deforms the topmost package onto the next-in-line package in the stack, while the heating adheres/ welds a portion of the topmost package to the next-in-line package in the stack, to result in a compact and solid stack.

The piston can have one or more additional functional positions. In some embodiments, the piston has an extracted position, in which the piston is entirely extracted out of the top chamber. Such a position enables a user to introduce the used packages through a top opening of the container, and/or permit a user to access the top chamber, e.g. for cleaning the container. By some other embodiments, the piston has a compaction position, lower than the extended position along the longitudinal axis of the container. The compaction position enables further compactization and/or flattening of the stack of packages, e.g. prior to extraction of the stack from the container.

According to some embodiments, the piston also comprises one or more rupturing or puncturing elements, configured to form one or more puncture holes or ruptures in the used package(s) prior to or during compaction. Such puncture holes or ruptures can assist in drainage of food residues from the used packages during application of pressure thereon, while also function as weakening locations, assisting in deformation and compaction of the used packages upon application of said pressure.

In some embodiments, the top chamber is integrable with the bottom chamber to form the container, for example by snap fitting, screw fitting, bayonet fitting, or any other suitable fitting. By other embodiments, the bottom chamber is integral (e.g. structurally integrated) with the top chamber.

It is to be understood that the present disclosure utilizes a top and bottom directionality, which refers to a vertical direction along the longitudinal axis of the container.

The term used food package (or food package) means to denote a receptacle in which one or more food substances are contained and utilized for the preparation of a food product therefrom, e.g. by a food preparation appliance. The food package can be rigid, semi-rigid (i.e. rigid but pliable), or flexible, and can be made of plastic material and/or deformable metal (e.g. aluminum). The food product produced by an appliance from the food substances in the food package can be solid, paste or liquid. By some embodiments, the food product produced from the is a cooled food product (e.g. ice-cream, frozen drink, sorbet, gelato, frozen yogurt, slushy, etc.), and the food substance(s) held within the food package (from which the food product is produced) is (are) in the form of a powder, a liquid, a paste, an emulsion, a gel, a solution or a dispersion.

By some embodiments, the food package is made of plastic material, e.g. polyethylene, polypropylene, polyethylene terephthalate (PET), etc. According to some embodiments, the food package is in the form of a pod or a capsule, having a package body defining an internal volume that holds the food substance(s), and sealed by a removable or rupturable foil, cover or film.

By a preferred embodiment, at least the body of the package is made out of plastic material. By some other preferred embodiments, the entire package (i.e. body and lid) is made out of one or more plastic materials.

By some other preferred embodiments, the package is a mono-material package.

In case the package contains a body and a lid that are made of different materials, such as a plastic body and a metal lid, it is sometimes desired to separate between the body and the lid before introduction into the top chamber of the unit. Such separation can be done manually by the user.

Alternatively, the unit can comprise one or more separation modules, that are designed to separate between the body of the package and its lid, and permit only the plastic body of the package to be introduced into the top chamber of the unit.

By some embodiments, the separation module is designed to separate between a body of the package and a rim integral therewith that carries the lid. In such embodiments, the separation module comprises a cavity for removably receiving said package and one or more blade elements disposed at a top portion of the cavity, operable to separate between the plastic body and the rim. The blade elements can be displaceable between a non-operative position in which the blades are prevented from contacting the package, and an operative position in which the blades are permitted to engage the package body at one or more locations thereof below the rim, to separate between the body and the rim.

According to some embodiments, said one or more blades are a plurality of blades, arranged circumferentially within the cavity, wherein when in the non-operative position the blades form an opening of the cavity having a first diameter that is larger than the package body's diameter however smaller than the rim's diameter, and when in the operative position the opening defined by the blades has a second diameter, smaller than the package body's diameter. According to some embodiments, the blades are arranged to form an iris configuration.

By some embodiments, said one or more blades is heatable. Such heating can assist, for example, in separating between the body and the rim when the package body is made out of plastic material.

According to some embodiments, the separation module is associated with the piston, such that displacement of the piston between its retracted and extended positions causes displacement of the one or more blades between their operative and non-operative positions, respectively. Thus, by some embodiments, the separation module is associated with the piston, such that operation of the piston operates the separation module.

By some embodiments, the food package is in the form of a pod or a capsule. According to other embodiments, the food package is a single-use food package. By other embodiments, the food package has a volume of no more than about 300 ml, and is suitable for the preparation of a single serving of the food product (i.e. the entire content of the food package is utilized in order to prepare said single serve of food product therefrom).

By some embodiments, the top chamber is dimensioned to receive a plurality of stackable, preferably nestable, used packages. For example, the top chamber can have an internal diameter which is larger by no more than 15% of an external diameter of the packages, thereby enabling only packages of a defined size to be insertable into the top chamber. Further, the similarity between the internal diameter of the top chamber and the external diameter of the packages ensures that the package can be inserted into the top chamber at a defined directionality, assisting in their proper stacking and compactization, while minimizing the overall volume of the unit.

As food residues accumulate in the bottom chamber, it is desired to delay fermentation between cleaning operations. Thus, by some embodiments, the bottom chamber is configured with a cooling arrangement to maintain the bottom chamber under cooled conditions.

However, in some cases, fermentation or biodegradation of the food residues is desired, for example when aiming at obtaining compostable waste. Thus, by some embodiments, the bottom chamber is maintained under conditions permitting beginning of fermentation or biodegradation of the food residues. For example, the bottom chamber can be configured to maintain bacterial growth hospitable temperatures (i.e. between 28° C. and 35° C.) and/or humid conditions. According to some embodiments, the bottom chamber comprises, or is associated with, a reservoir of one or more enzymes, and configured to dispense metered doses of enzymes onto the food residues to permit initiation of enzymatic biodegradation. According to some embodiments, the bottom chamber comprises a temperature adjustment module.

According to some embodiments, the top chamber is configured with a cooling and/or heating arrangement, to permit control over the temperature within the top chamber. In some embodiments, the cooling/heating arrangement is configured to periodically cool the sidewalls of the top chamber in order to permit condensation of moisture onto its sidewalls. Such condensation is permitted to gravitationally trickle along the sidewalls of the top chamber and carry with it, towards the bottom chamber, any food residues that may accumulate on the sidewalls of the top chamber. Hence, such periodic cooling functions as cleaning means of the top chamber.

The top chamber can, by some embodiments, be configured to receive a user-removable liner, that can facilitate the user with means for extraction of the stack of packages from the top chamber. By some embodiments, the liner is a flexible bag, having at least a bottom portion thereof being permeable to said food residues. In other words, the liner can be in the form of a flexible bag or flexible container that can be applied over the sidewalls of the top chamber, while having a permeable bottom portion that permits permeation of the food residues towards the bottom chamber when the bag is fitted within the top chamber. By some embodiments, the top chamber is configured with fixing means for detachably fixing the liner to the top chamber.

As noted, the piston comprises a heatable plate that applies heating to adhere the food packages one to the other during compaction. By some embodiments, the heatable plate is heatable to a temperature of at most about 350° C., for example between about 150° C. and about 350° C., enabling adherence and/or welding of packages made of plastic one to the other. Such adhering results in a stack of packages which are bonded one to the other in a manner permitting their extraction from the chamber as a solid, compact block.

In addition to the gravitational separation of the food residues from the packages during compaction, heating can be carried out to permit at least partial decomposition or burning of at least part of the food residues (as these are organic materials), thereby resulting in compacted stack containing a reduced content of food residues. Such a compacted stack can then be utilized, without further cleaning, in various recycling processes. Thus, the compacted stack produced by the unit of this disclosure can be utilized as raw material for further recycling and processing to eventually obtain new food packages for subsequent use. In other words, treating of the used food packages by the unit of this disclosure can be a first step, carried out at the point of use by the user, in the recycling process of the packages.

As the unit is designed for temporarily storing used food packages, gases, decomposition products and/or malodors can develop due to fermentation and/or partial decomposition of the food residues in between emptying operations. Hence, by some embodiments, the sidewalls of the top chamber and/or bottom chamber are configured with (or at least partially lined with) one or more absorbing materials capable of absorbing volatile decomposition products. For example, said one or more absorbing materials can be activated carbon or charcoal. The absorbing materials can be in the form of a replaceable cartridge, permitting replacement of the absorbing material on periodical basis.

By some other embodiments, the sidewalls of the top chamber and/or bottom chamber are configured with (or at least partially lined with) one or more odorant materials capable of releasing one or more volatile odorant agents.

For facilitating ease of access to the bottom chamber, the perforated element is, by some embodiments, user-removable. By some other embodiments, the bottom chamber is configured with one or more sealable draining openings to permit draining of said food residues.

By some embodiments, the bottom chamber is configured as a drawer or a slidable chamber, such the bottom chamber can be slid out of the unit for its emptying and cleaning.

By further embodiments, the top chamber can be configured with a reclosable opening in a sidewall thereof to permit extraction of the stack.

By some embodiments, the unit comprises a rinsing module, permitting provision of one or more rinsing fluids into the chamber for washing thereof. Rinsing can be carried out periodically and/or upon user demand.

The unit can, by some embodiments, comprise one or more sensors and/or indication means providing the user with various indications, for example the position of the piston, the temperature of the bottom and/or top chamber, the status (i.e. % filling) of the bottom and/or top chamber, a time counter providing indication when emptying of the chambers is required, etc.

The unit of this disclosure can be a stand-alone unit, i.e. detached from an appliance that utilizes the food packages. Alternatively, the unit of this disclosure can be linked (i.e. electrically, thermally, electronically and/or operationally) to an appliance that utilizes the food packages (e.g. a coffee machine, an ice-cream machine, etc.).

In other configurations, the unit can be an integral part of such an appliance. By such embodiments, the appliance can be configured to convey the used food package from a feeding module of the appliance towards the unit of this disclosure, such that after utilization by the appliance and emptying of at least a majority of the content of the package into the appliance for processing into a finalized food product, the used package is conveyed into the top chamber of the unit for treating.

According to another aspect of this disclosure, there is provided an appliance utilizing a food package for preparing a food product, the appliance comprising a unit as described herein for treating the food packages after their utilization.

As used herein, the term about is meant to encompass deviation of +10% from the specifically mentioned value of a parameter, such as temperature, pressure, concentration, etc.

Whenever a numerical range is indicated herein, it is meant to include any cited numeral (fractional or integral) within the indicated range. The phrases ranging/ranges between a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

An exemplary unit according to this disclosure is shown in FIGS. 1-4. Unit 100 comprises a container 102, which is composed of top chamber 104 and bottom chamber 106. In this specific example, the top and bottom chamber are integral with one another. However, it is to be understood that the chambers can also be integrable with one another, i.e. configured to be detachably attachable one to the other in order to obtain container 102.

Figure 1:
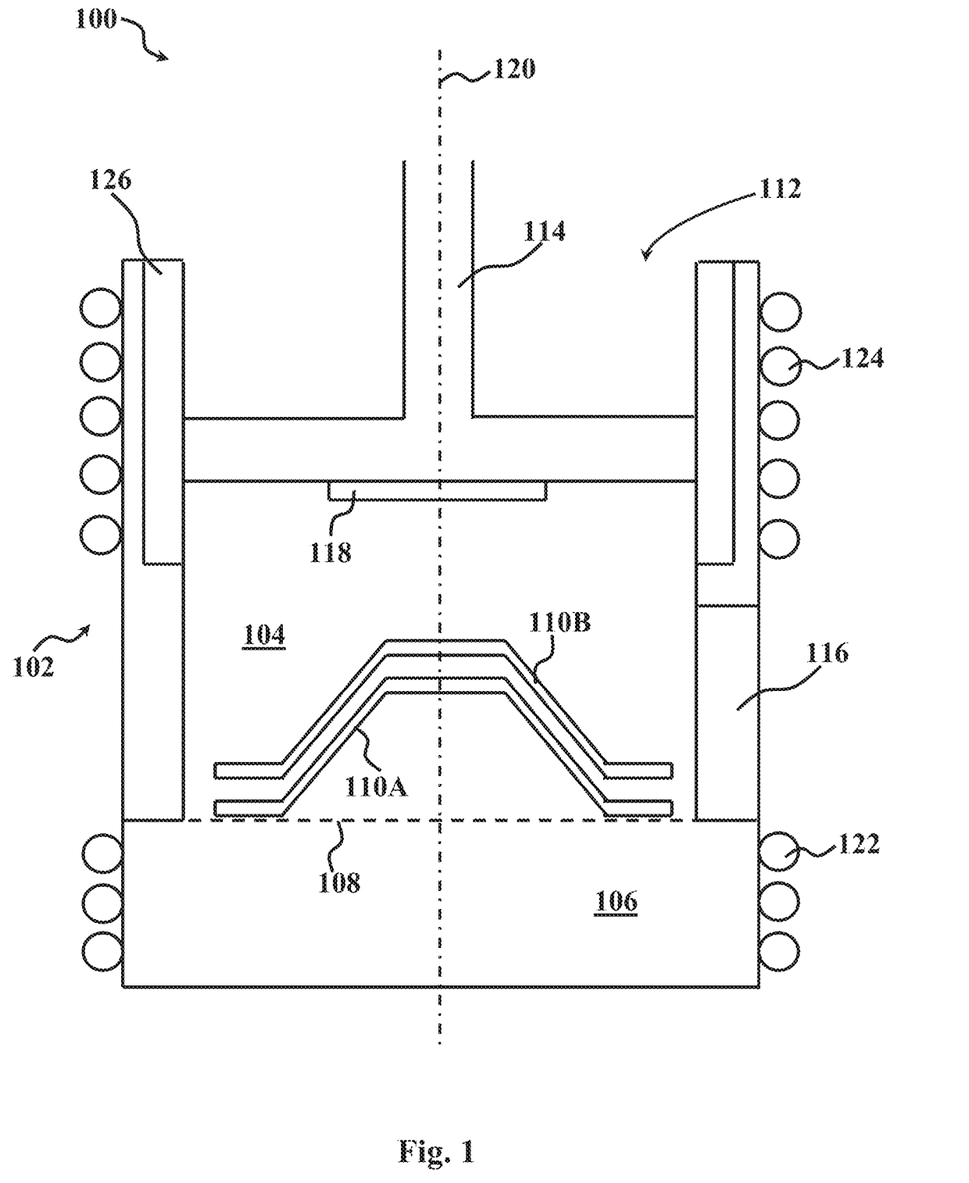
FIG. 1 is a schematic representation of a longitudinal cross-section through a unit according to an embodiment of the present disclosure, with the piston in a retracted position.
Figure 2:
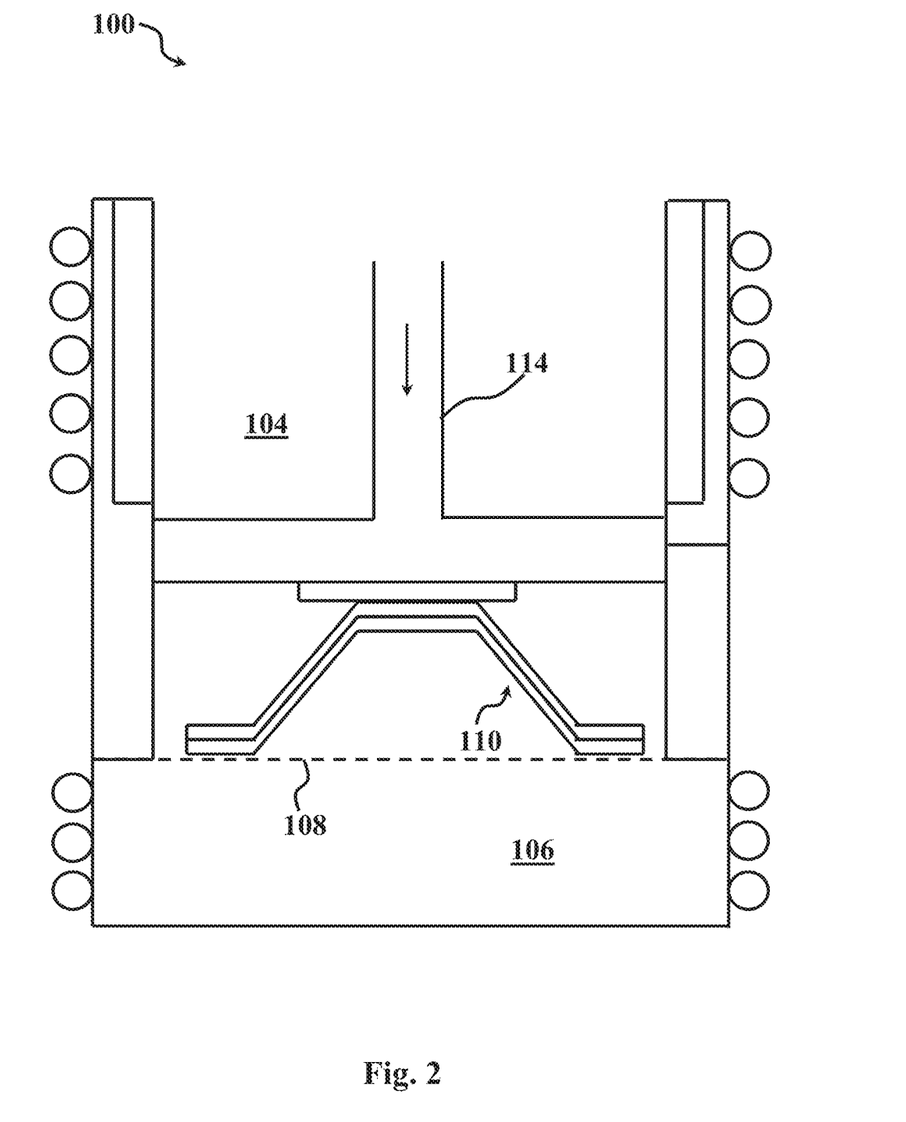
FIG. 2 is a schematic representation of the unit of FIG. 1, with the piston in an extended position.

Separating between top chamber 104 and bottom chamber 106 is a perforated element 108, which can be a substantially horizontal, perforated wall, that permits passage of food residues therethrough towards the bottom chamber 106. Perforated element 108 can be user-removable in order to permit access to the bottom chamber for cleaning thereof. In addition, or alternatively, bottom chamber 106 can have one or more scalable draining outlets (not shown) to permit draining of the bottom chamber.

Figure 4:
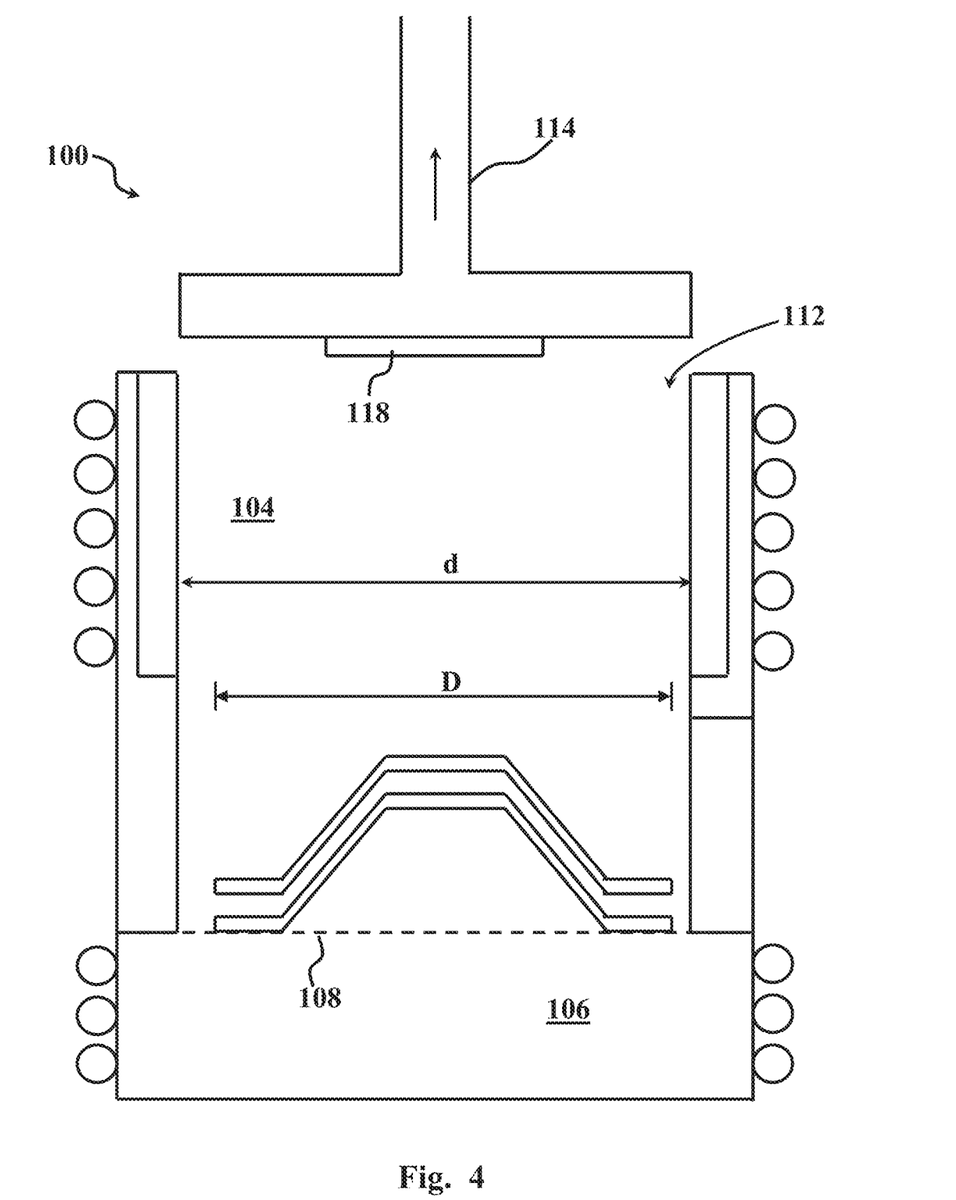
FIG. 4 is a schematic representation of the unit of FIG. 1, with the piston in an extracted position, permitting user-access to the top chamber.

Top chamber 104 is dimensioned to receive a stack of used food packages, generally designated 110. The used food packages can be typically inserted by a user one after the other into the top chamber via top opening 112 of chamber 102 when piston 114 is at an extracted position (i.e. a position in which the piston 114 is completely out of the container, as seen in FIG. 4). Alternatively, used food packages can be inserted into the top chamber via reclosable opening (e.g. a door) 116 defined in a sidewall of the top chamber 104.

The top chamber 104 accommodates piston 114, that comprises a substantially horizontal, heatable plate 118. The piston is axially displaceable (along longitudinal axis 120) within the top chamber 104 between a retracted position in which plate 118 does not contact said topmost food package 110B of the stack 110 (as seen in FIG. 1), and an extended position (shown in FIG. 2), in which the plate 118 comes into contact with a topmost food package of the stack 110B. Piston 114 is configured to apply pressure onto stack 110 when in the extended position in order to compact the stack to reduce its volume, while also assisting in extracting the food residues from the food packages to permit these to trickle through perforated element 108 towards bottom chamber 106, in which these accumulate. Heatable plate 118 is configured to heat at least a portion of the topmost food package 110B in the stack when the piston 114 is in the extended state, thereby adhering topmost food package 110B to a next-in-line food package 110A (previously inserted by the user into the top chamber 104), thereby obtaining compaction of stack 110 (as can best be seen in FIG. 2).

Figure 3:
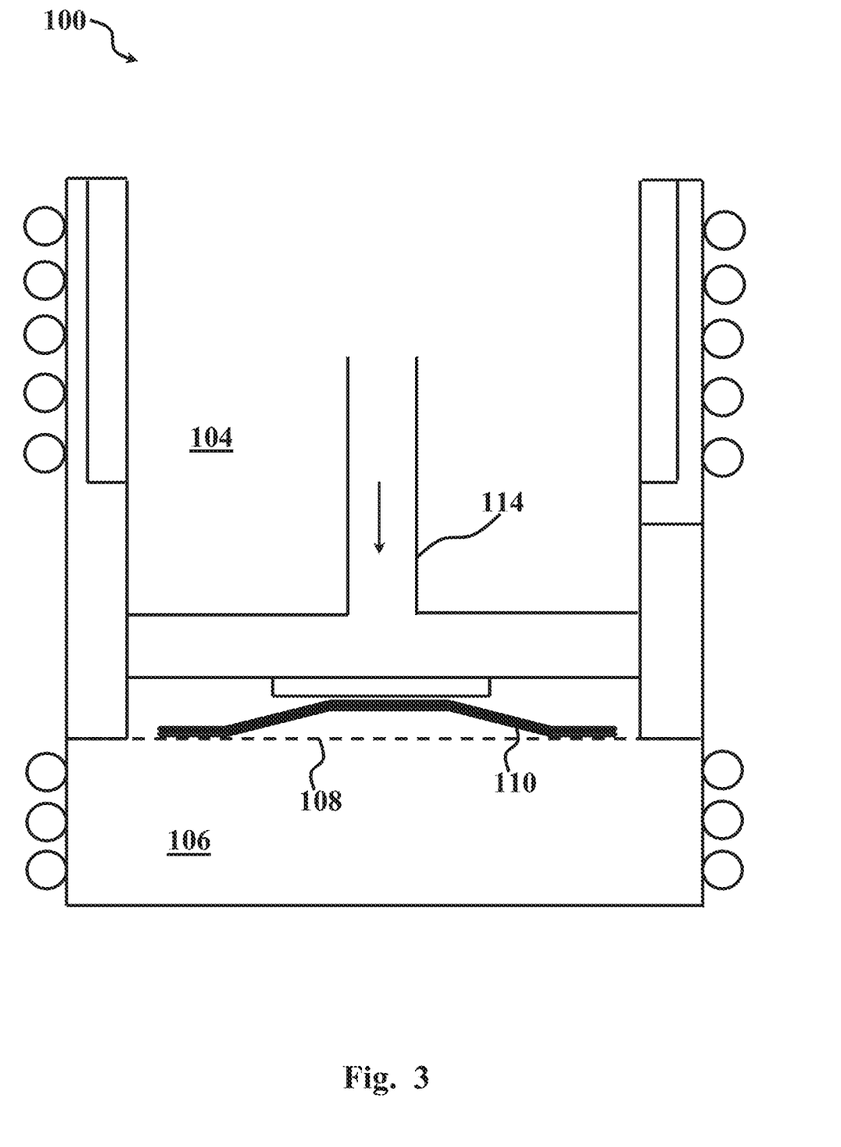
FIG. 3 is a schematic representation of the unit of FIG. 1, with the piston at a compactization position.

Further compactization can be obtained by further axial displacement of piston 114 from the extended position to the compactization position, shown in FIG. 3, in which further pressure and heating allow for further deformation of the stack into a substantially flat, compact form. Further, in addition to the gravitational separation of the food residues from the packages during compaction, heating can be carried out to permit at least partial decomposition or burning of at least part of the food residues (as these are organic materials), thereby resulting in compacted stack containing a reduced content of food residues. Such a compacted stack can then be utilized, without further cleaning, in various recycling process During operation, a user inserts a first used package 110A (for example a used capsule or pod) into top chamber 104, with the capsule opening facing perforated wall 108, thereby allowing food residues to gravitationally trickle from the capsule 110A, through the perforated element 108, and into bottom chamber 106. A user can then selectively operate the piston to at least partially compact capsule 110A, however such is not mandatory. Upon insertion of a second, subsequent capsule 110B into the top chamber 104, the capsules are stacked one over the other, and preferably at least partially nested one within the other. The piston 114 is then displaced from the retracted position to its extended position, to apply pressure onto capsule 110B, while also applying heating by the heatable plate 118. The applied pressure deforms the capsules, while the heating adheres/welds a portion of capsule 110B to the next-in-line capsule 110A, to result in a compact and solid stack. In case further compactization is desired the piston 114 is further displaced into the compactization position (as seen in FIG. 3), to further deform and compact the stack.

Figure 5:
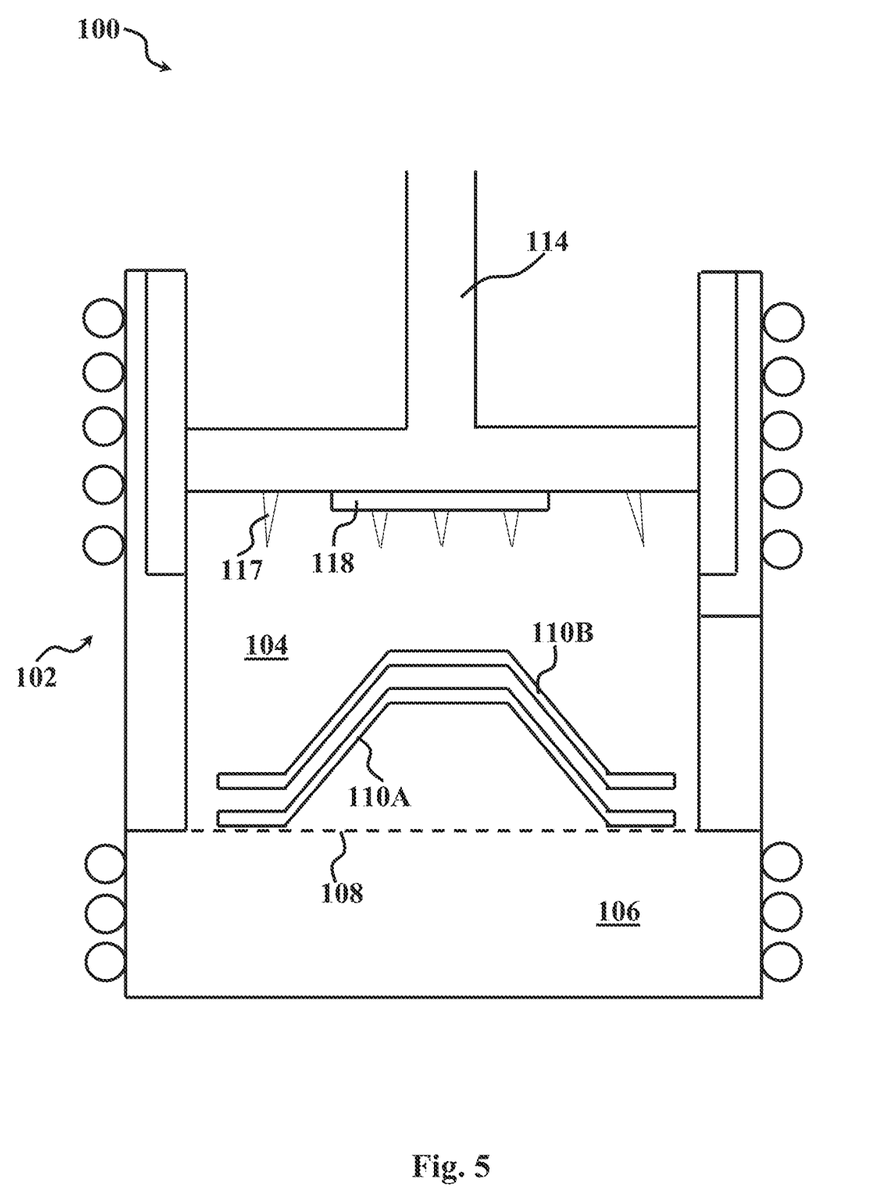
FIG. 5 is a schematic representation of the unit of FIG. 1, with a piston that includes puncturing elements.

The piston can be configured with one or more rupturing or puncturing elements 117 (FIG. 5), such as spikes, blades, needles, etc., that are configured to form one or more punctures or ruptures in the used package prior to or during compaction by the piston. In other words, during the piston's displacement from the retracted position to the extended position, the one or more rupturing or puncturing elements 117 form punctures or ruptures in the used package, thereby assisting food residues to drain from the used packages towards the bottom chamber during application of pressure. Such punctures can also function as weakening locations, assisting in deformation and compaction of the used packages.

Top chamber 104 can be dimensioned to receive a plurality of stackable used capsules in a manner that will permit directional insertion of the packages therein. For example, top chamber 104 can have an internal diameter d which is larger by no more than 15% of an external diameter D of the packages (as seen in FIG. 4), thereby enabling only packages of a defined size to be insertable into the top chamber. Further, the similarity between the internal diameter of the top chamber and the external diameter of the packages ensures that the capsules can be inserted into the top chamber at a defined directionality, assisting in their proper stacking and compactization, while minimizing the overall volume of the unit.

As noted, the bottom chamber is designed to accumulate food residues. As such food residues are prone to fermentation or partial decomposition, it may be desired to delay such processes in between cleaning operations. Therefore, the bottom chamber 106 can be configured with a temperature controlling arrangement, such as cooling/heating arrangement 122, to maintain the bottom chamber under desired conditions.

Similarly, it is sometimes desired to control the temperature within the top chamber 104. Thus, top chamber 104 can be configured with a cooling and/or heating arrangement 124, to permit control over the temperature therein. Such the cooling/heating arrangement can be configured to periodically cool the sidewalls of the top chamber in order to permit condensation of moisture onto its sidewalls. Such condensation is permitted to gravitationally trickle along the sidewalls and carry with it, towards the bottom chamber, any food residues that may accumulate on the sidewalls of the top chamber. Hence, such periodic cooling functions as cleaning means of the top chamber.

Figure 6:
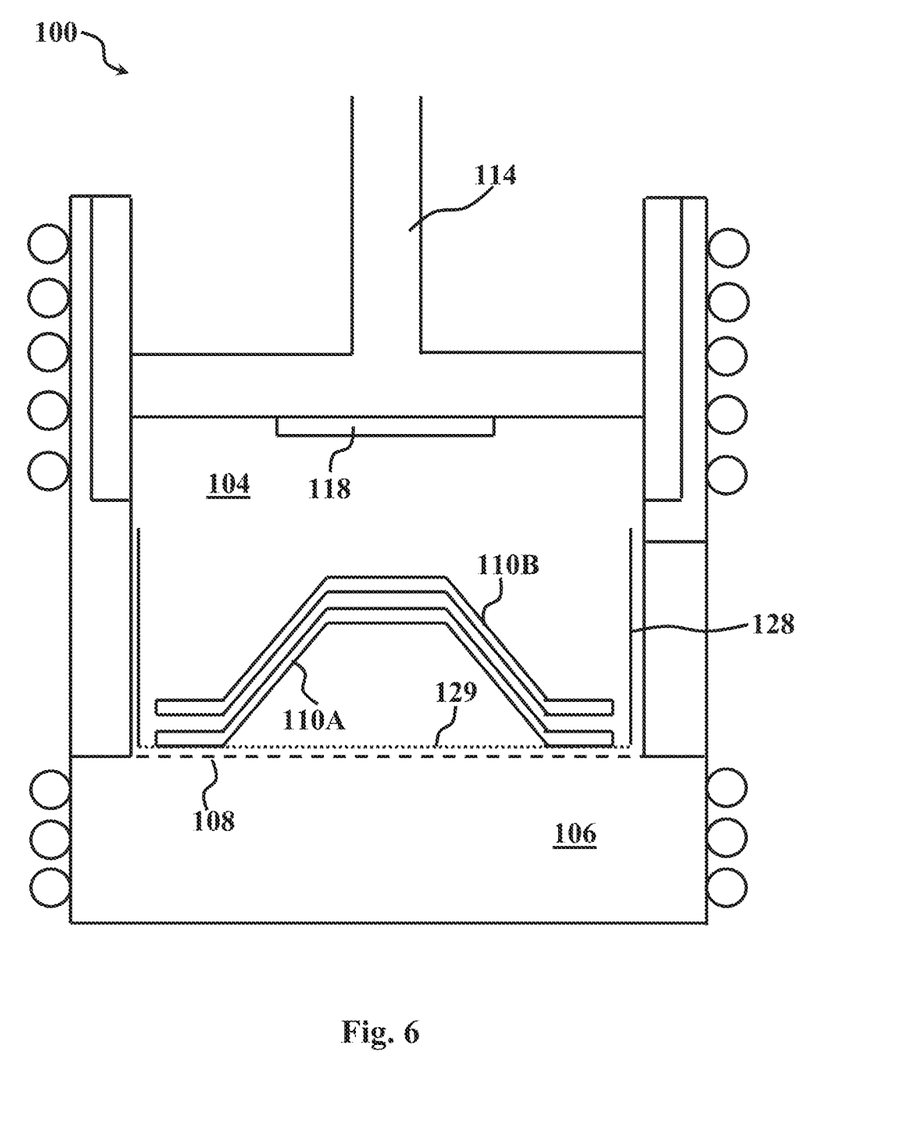
FIG. 6 is a schematic representation of the unit of FIG. 1, with a user-replaceable liner lining the walls of the top chamber.

Turning to FIG. 6, the top chamber 104 can be designed to receive a user-removable liner 128, that can facilitate the user with means for extraction of the stack of packages from the top chamber. The liner can, for example, be in the form of a flexible bag, having at least a bottom portion 129 that is permeable to the food residues, to permit their passage towards the bottom chamber 106.

As the unit is designed for temporarily storing used food packages, gases, decomposition products and/or malodors can develop due to fermentation and/or partial decomposition of the food residues in between emptying operations. In order to avoid such malodors, the sidewalls of the top chamber 104 and/or bottom chamber 106 can be configured with (or at least partially lined with) one or more absorbing materials 126 capable of absorbing volatile decomposition products. For example, the absorbing material can be an activated carbon replaceable cartridge, permitting replacement of the absorbing material on a period basis.

As noted, the unit can further comprise one or more indicating means (not shown) providing the user with various indications, for example the position of the piston, the temperature of the bottom and/or top chamber, the status (i.e. % filling) of the bottom and/or top chamber, a time counter providing indication when emptying of the chambers is required, etc.

Figure 7A:
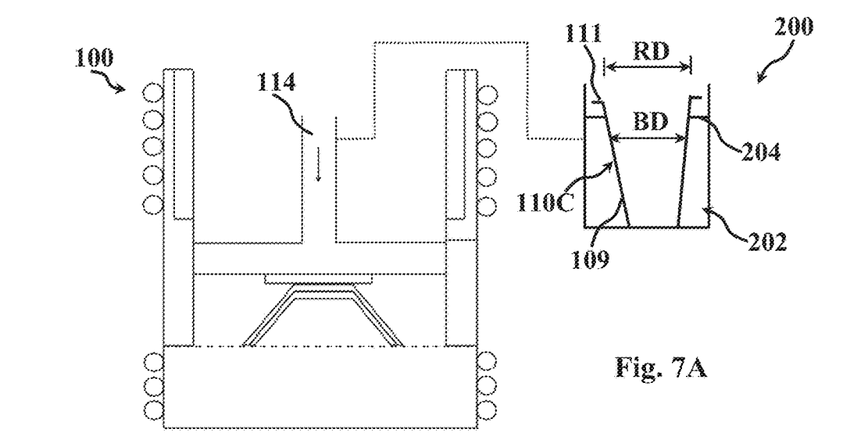
FIGS. 7A-7D are schematic representations of a separation module, associated with the unit of FIG. 1, at a piston extended position and a piston retracted position (FIGS. 7A and 7C, respectively); and top views of the blade elements at their non-operative and operative positions (FIGS. 7B and 7D, respectively).
Figure 7B:
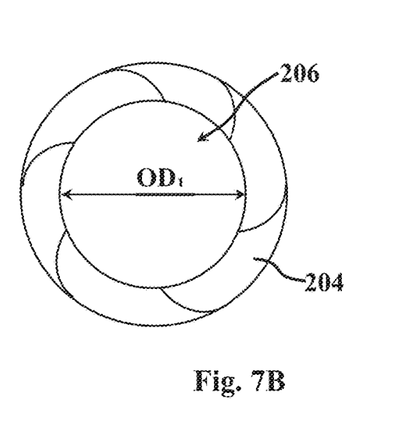
Figure 7C:
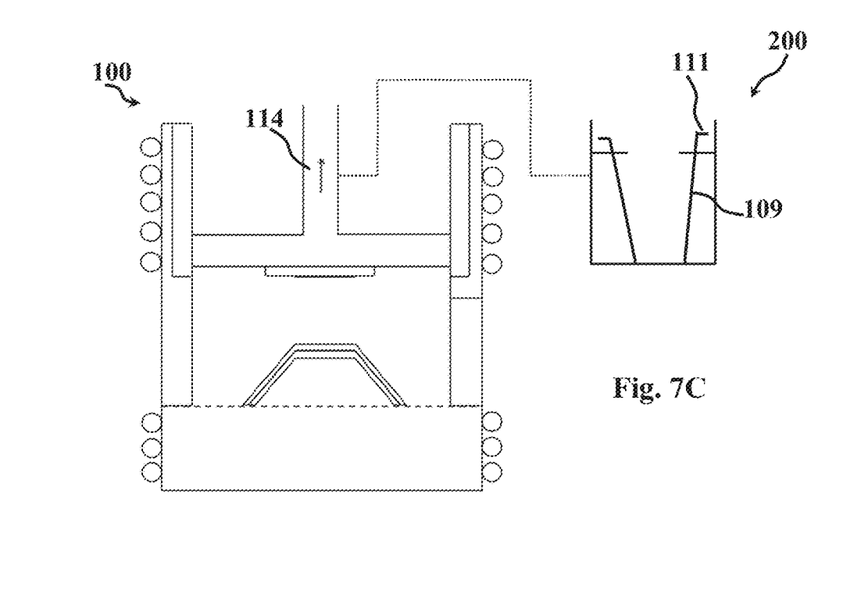
Figure 7D:
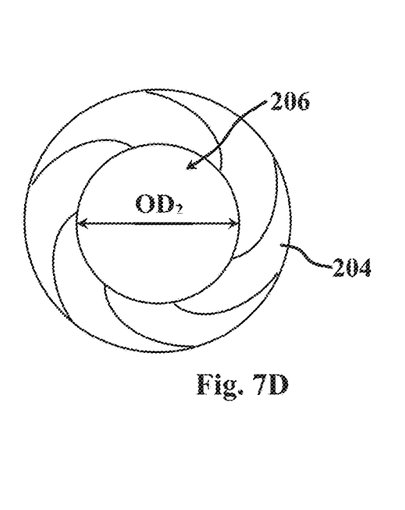

Seen in FIGS. 7A-7D is a separation module designed to separate between a body of the package and a rim integral therewith that carries the lid. Such separation may be required, for example, when the body and the lid of the package are made of different materials, e.g. plastic and metal. Separation module 200 of this example has a cavity 202 for removably receiving package 110C, that has a package body 109 and a rim 111 that carries the package's lid (not shown). The cavity is dimensioned to receive the package 110C such that blade elements 204, fitted at a top portion of the cavity 202, a positioned below the rim 111. The blade elements, as best seen in FIGS. 7B and 7D, are arranged circumferentially, and defining an opening 206.

The blade elements 204 are displaceable between a non-operative position, seen in FIG. 7B, in which the blade elements are prevented from contacting the package 110C, and an operative position, seen in FIG. 7D, in which the blades are permitted to engage the package body 109 below the rim 111 to separate between the body 109 from the rim 111.

As can be seen in FIGS. 7A-7B, when the blade elements 204 are in their non-operative position, opening 206 has a first diameter $OD_1$ that is larger than the package body's diameter BD however smaller than the rim's diameter RD; when in the operative position seen in FIGS. 7C-7D, opening 206 is reduced by the displacement of the blade elements 204 to a second diameter $OD_2$, smaller than the package body's diameter BD. Thus, when the blade elements switch from their non-operative position to their operative position, the blade elements engage the package body and disconnect between the body and the rim.

As an also be seen in FIGS. 7A and 7C, the separation module 200 can be associated or linked to unit 100, such that displacement of the piston 114 between its extended position (FIG. 7A) and retracted position (FIG. 7C) causes displacement of the blade elements 204 between their non-operative position (FIG. 7B) and operative position (FIG. 7D), respectively.

It is to be understood that the separation module shown in FIGS. 7A-7D is exemplary, and a skilled artisan would understand that the same principle can be manifested by similar or other arrangements, all of which a contemplated to be within the scope of the present disclosure.

The invention claimed is:

1. A unit for treating used food packages, comprising
   a container having a longitudinal axis and dimensioned to receive one or more used stackable food packages, the container having
   a top chamber, dimensioned to receive a stack of said food packages,
   a bottom chamber integrable with the top chamber, and configured to receive food residues, and
   a perforated element, separating between the top chamber and the bottom chamber, configured to permit said food residues to pass therethrough from the food packages stacked in the top chamber to the bottom chamber;
   a piston configured with a substantially horizontal, heatable plate,
   the piston being axially displaceable within the top chamber between an extended position, in which the plate comes into contact with a topmost food package of the stack, and a retracted position in which the plate does not contact said topmost food package of the stack,
   the piston being configured to apply pressure onto said stack when in the extended position, and
   the heatable plate being configured to heat at least a portion of the topmost food package in said stack when in the extended state, thereby adhering said topmost food package to a next-in-line food package in said stack to obtain a compacted stack of said used food packages, and
   wherein the unit further comprises a separation module operational to separate between a body of the used food packages and a rim thereof that carries a lid of the used food packages.

2. The unit of claim 1, wherein the bottom chamber is integral with the top chamber.

3. The unit of claim 1, wherein the perforated element is a substantially horizontal, perforated wall.

4. The unit of claim 1, wherein said bottom chamber is configured with a cooling arrangement.

5. The unit of claim 1, wherein said top chamber is configured with a cooling and/or heating arrangement.

6. The unit of claim 1, wherein the top chamber is configured to receive a user-removable liner.

7. The unit of claim 6, wherein said liner is a flexible bag, having at least a bottom portion thereof being permeable to said food residues.

8. The unit of claim 1, wherein sidewalls of the top chamber and/or bottom chamber are configured with one or more absorbing materials.

9. The unit of claim 1, wherein said heatable plate is heatable to a temperature of between about 150 and about 350° C.

10. The unit of claim 1, wherein said perforated element is user-removable to permit access to said bottom chamber.

11. The unit of claim 1, wherein said bottom chamber is configured with one or more sealable draining openings to permit draining of said food residues.

12. The unit of claim 1, wherein the top chamber is configured with a reclosable opening in a sidewall thereof to permit extraction of the stack.

13. The unit of claim 1, wherein said top chamber is dimensioned to receive a plurality of stackable used capsules.

14. The unit of claim 13, wherein the top chamber has an internal diameter which is larger by no more than 15% of an external diameter of said capsules.

15. The unit of claim 1, wherein the piston further has an extracted position, in which the piston is extracted from the top chamber to permit user-access to the top chamber.

16. The unit of claim 1, wherein the piston further has a compaction position, lower than the extended position along the longitudinal axis of the container, to permit further compactization and/or flattening of the stack of packages.

17. The unit of claim 1, wherein the piston comprises one or more rupturing or puncturing elements, configured to form one or more punctures or ruptures in the used packages when the piston is at the extended position.

18. The unit of claim 1, wherein the separation module is associated with the piston, such that operation of the piston operates the separation module.

* * * * *